United States Patent
Venable et al.

(10) Patent No.: US 12,435,276 B1
(45) Date of Patent: Oct. 7, 2025

(54) PYROLYSIS FOR THE MANAGEMENT OF WASTE

(71) Applicant: Arborhill Ventures, LLC, Burton, MI (US)

(72) Inventors: Joshua James Venable, Tallahassee, FL (US); Austin William Holsinger, Detroit, MI (US)

(73) Assignee: ARBORHILL VENTURES, LLC, Burton, MI (US)

( * ) Notice: Subject to any disclaimer, the term of this patent is extended or adjusted under 35 U.S.C. 154(b) by 56 days.

(21) Appl. No.: 18/308,400

(22) Filed: Apr. 27, 2023

Related U.S. Application Data

(60) Provisional application No. 63/363,670, filed on Apr. 27, 2022.

(51) Int. Cl.
| | |
|---|---|
| *C10B 53/00* | (2006.01) |
| *B03B 9/06* | (2006.01) |
| *B09B 3/35* | (2022.01) |
| *B09B 3/40* | (2022.01) |

(Continued)

(52) U.S. Cl.
CPC ............... *C10B 53/00* (2013.01); *B03B 9/06* (2013.01); *B09B 3/35* (2022.01); *B09B 3/40* (2022.01); *C10B 53/02* (2013.01); *C10B 57/10* (2013.01)

(58) Field of Classification Search
CPC ......... C10B 53/00; C10B 53/02; C10B 57/10; B09B 3/35; B09B 3/40; B03B 9/06
See application file for complete search history.

(56) References Cited

U.S. PATENT DOCUMENTS

| 4,098,649 A | * | 7/1978 | Redker ..................... C10B 7/10 201/2.5 |
| 4,308,807 A | | 1/1982 | Stokes |
| 5,544,597 A | | 8/1996 | Camacho |

(Continued)

FOREIGN PATENT DOCUMENTS

| CN | 203866250 U | 10/2014 |
| DE | 19609721 A1 | 9/1997 |

(Continued)

OTHER PUBLICATIONS

Chen, D., et al. "Pyrolysis technologies for municipal solid waste: A review". Waste Management (2014), URL: http://dx.doi.org/10.1016/j.wasman.2014.08.004.

(Continued)

*Primary Examiner* — Jonathan Miller
(74) *Attorney, Agent, or Firm* — Knobbe, Martens, Olson & Bear, LLP

(57) ABSTRACT

Systems and method for managing municipal solid waste are provided herein. In particular, a production unit configured to pyrolyze municipal solid waste may be located at a waste facility. In some embodiments, when municipal solid waste is received at the waste facility, the municipal solid waste may be sorted by into green waste, brown waste, and/or mixed waste. The green waste, brown waste, and/or mixed waste may be resized and/or dried before the green waste, brown waste, and/or mixed waste are pyrolyzed. The production unit may pyrolyze the green waste, brown waste, and/or mixed waste to produce biochar. The biochar may be stored at the waste facility or transported from the waste facility to sequester carbon.

19 Claims, 5 Drawing Sheets

(51) Int. Cl.
*C10B 53/02* (2006.01)
*C10B 57/10* (2006.01)

(56) References Cited

U.S. PATENT DOCUMENTS

| | | | |
|---|---|---|---|
| 5,678,496 | A | 10/1997 | Buizza et al. |
| 5,868,085 | A | 2/1999 | Hansen et al. |
| 5,996,512 | A * | 12/1999 | Morin ............... F23J 15/02 |
| | | | 110/220 |
| 6,178,899 | B1 | 1/2001 | Kaneko et al. |
| 6,619,214 | B2 | 9/2003 | Walker |
| 6,840,184 | B2 | 1/2005 | Eberhardt et al. |
| 6,871,603 | B2 | 3/2005 | Maxwell |
| 6,981,455 | B2 | 1/2006 | Lefcort |
| 7,302,897 | B2 | 12/2007 | Pallett et al. |
| 7,394,041 | B2 | 7/2008 | Choi |
| 7,878,131 | B2 * | 2/2011 | Becchetti ............... C10J 3/66 |
| | | | 110/220 |
| 8,100,990 | B2 * | 1/2012 | Ellens ............... C10L 5/447 |
| | | | 44/589 |
| 8,558,044 | B2 * | 10/2013 | Smaidris ............... C10B 53/02 |
| | | | 201/22 |
| 9,617,487 | B2 * | 4/2017 | Zhu ............... C07C 51/09 |
| 9,920,251 | B2 * | 3/2018 | Karanikas ............... B29B 17/04 |
| 9,994,774 | B2 * | 6/2018 | Li ............... C10B 47/30 |
| 10,907,827 | B2 | 2/2021 | del Campo |
| 10,961,459 | B2 * | 3/2021 | Seidner ............... C10G 1/04 |
| 11,345,860 | B2 * | 5/2022 | Seidner ............... C10L 5/447 |
| 11,465,948 | B2 * | 10/2022 | Aramburu ............... G05D 1/0246 |
| 11,530,358 | B2 * | 12/2022 | Bertrand ............... F27B 7/14 |
| 11,674,086 | B2 * | 6/2023 | Seidner ............... C10B 57/06 |
| | | | 201/21 |
| 11,827,860 | B2 * | 11/2023 | Ribeiro De Lima ... C10B 57/08 |
| 2005/0039650 | A1 | 2/2005 | Cole et al. |
| 2006/0005749 | A1 * | 1/2006 | Shih ............... F23J 1/00 |
| | | | 110/165 R |
| 2007/0113761 | A1 | 5/2007 | Cole et al. |
| 2007/0186829 | A1 | 8/2007 | Cole et al. |
| 2007/0289507 | A1 | 12/2007 | Parrott et al. |
| 2008/0006520 | A1 * | 1/2008 | Badger ............... C10B 51/00 |
| | | | 202/202 |
| 2008/0236042 | A1 | 10/2008 | Summerlin |
| 2009/0020052 | A1 | 1/2009 | Becchetti et al. |
| 2010/0293853 | A1 * | 11/2010 | Feerer ............... C10B 47/44 |
| | | | 48/203 |
| 2011/0258914 | A1 * | 10/2011 | Banasiak ............... C10K 1/02 |
| | | | 44/605 |
| 2012/0103781 | A1 * | 5/2012 | Smaidris ............... C10C 5/00 |
| | | | 201/8 |
| 2013/0256113 | A1 * | 10/2013 | Tumiatti ............... C10B 49/14 |
| | | | 422/187 |
| 2016/0083663 | A1 * | 3/2016 | Zhu ............... C07C 51/09 |
| | | | 44/388 |
| 2018/0015515 | A1 * | 1/2018 | Sivakumar ............... C10B 53/07 |
| 2019/0029328 | A1 | 1/2019 | Anderson |
| 2020/0165526 | A1 * | 5/2020 | Bertrand ............... F23G 5/027 |
| 2022/0306940 | A1 * | 9/2022 | Goldschlager ............... C10K 1/001 |

FOREIGN PATENT DOCUMENTS

| | | |
|---|---|---|
| DE | 19937524 A1 | 2/2001 |
| DE | 10333279 A1 | 3/2004 |
| EP | 0545241 B1 | 2/1996 |
| WO | WO 2005/066315 A1 | 7/2005 |
| WO | WO 2016/168894 A1 | 10/2016 |

OTHER PUBLICATIONS

"Pyrolysis Reactors" ARTi, Wayback Machine, Mar. 7, 2022, 9 pages. URL: https://www.arti.com/reactors/.

* cited by examiner

PYROLYSIS FOR THE MANAGEMENT OF WASTE

INCORPORATION BY REFERENCE TO ANY PRIORITY APPLICATIONS

This application claims priority to U.S. Provisional Patent Application No. 63/363,670, filed Apr. 27, 2022, which is incorporated herein by reference. Any and all applications for which a foreign or domestic priority claim is identified in the Application Data Sheet as filed with the present application are hereby incorporated by reference under 37 CFR 1.57.

FIELD

The present disclosure relates to a process of using pyrolysis for the management of municipal solid waste. More specifically the present disclosure relates to a process of producing biochar from green and brown municipal solid waste.

BACKGROUND

Currently, several methods are used by municipalities for the management of the vast majority of municipal solid waste (MSW). Municipalities may use landfilling, recycling, combustion, waste-to-energy and/or composting. However, current methods of MSW management each have significant drawbacks when used for the management of green and brown waste. Landfilling takes up valuable space, and the green and brown waste emits greenhouse gases and decomposes more rapidly than other waste, which can make landfills unstable. Recycling can be used by municipalities for the management of some types of MSW such as plastics, glass, metals etc., however, green waste and some brown waste may not be recycled with the same process as plastics, glass, metals, etc. Combustion of green and brown waste may produce significant amount of air pollutants. Although some types of MSW may generate significant amounts of energy when combusted, relatively, green and brown waste have a low calorific value, so converting the waste into energy is inefficient. Composting requires space and energy for compost generation, the demand for composting is finite, compost emits greenhouse gases, compost is a significant source of blight and odor, and composting can increase propagation of invasive species and pathogens.

SUMMARY

For purposes of this summary, certain aspects, advantages, and novel features of the invention are described herein. It is to be understood that not all such advantages necessarily may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

In some embodiments, a method for management of municipal solid waste at a municipal solid waste processing facility may include receiving feedstock at the municipal solid waste processing facility, wherein the feedstock includes green waste and/or brown waste, and wherein the feedstock includes a plurality of particles each having a size; inspecting the feedstock for foreign objects; removing foreign objects from the feedstock; sorting the feedstock into one or more feedstock groups, wherein each feedstock group includes a plurality of particles of a different feedstock type; drying the one or more feedstock groups so a moisture content of each of the one or more feedstock groups is below a predetermined moisture content threshold; resizing the particles of the one or more feedstock groups so the size of each of the plurality of particles are less than a predetermined particle size; feeding a mixture of the one or more feedstock groups into a mobile pyrolysis reactor, wherein the mobile pyrolysis reactor is located at the municipal processing facility; and pyrolyzing the mixture of the one or more feedstock groups via the mobile pyrolysis reactor to generate biochar.

In some embodiments, the predetermined moisture content threshold may be 40 percent.

In some embodiments, the plurality of particles may include a largest cross-sectional area of each of the plurality of particles and the predetermined particle size may include an area of about 1 $in^2$.

In some embodiments, a method, wherein resizing the plurality particles of the one or more feedstock groups includes manually resizing the particles, and/or feeding the particles through a chipper and/or a grinder.

In some embodiments, the mixture may include a weight and the biochar may include a weight, and wherein the weight of the biochar is 25 percent or less of the weight of the mixture.

In some embodiments, after resizing the plurality of particles of the one or more feedstock groups so the size of the particles is less than a predetermined particle size, the method may include drying the one or more feedstock groups so the moisture content of each of the one or more feedstock groups is below a second predetermined moisture content threshold.

In some embodiments, the second predetermined moisture content threshold may be 30 percent.

In some embodiments, the method may be performed by two operators.

In some embodiments, the method may include starting the pyrolysis reactor with a startup mixture of the one or more feedstock groups, and the startup mixture may include only brown waste.

In some embodiments, a method for management of municipal solid waste at a municipal solid waste processing facility may include: receiving feedstock at the municipal solid waste processing facility, wherein the feedstock includes green waste and/or brown waste, and wherein the feedstock includes a plurality of particles each having a size; inspecting the feedstock for foreign objects; removing foreign objects from the feedstock; sorting the feedstock into one or more feedstock groups, wherein each feedstock group includes a plurality of particles of a different feedstock type; drying the one or more feedstock groups so a moisture content of each of the one or more feedstock groups is below a first predetermined moisture content threshold; resizing the plurality of particles of the one or more feedstock groups so the size of the plurality of particles are less than a predetermined particle size, wherein the resizing includes manually resizing the plurality of particles, and/or feeding the plurality of particles through a chipper and/or a grinder; drying the one or more feedstock groups so the moisture content of each of the one or more feedstock groups is below a second predetermined moisture content threshold; feeding a mixture of the one or more feedstock groups into a mobile pyrolysis reactor, wherein the mobile pyrolysis reactor is located at the municipal processing facility; and pyrolyzing the mixture of the one or more feedstock groups via the mobile pyrolysis reactor to generate biochar.

In some embodiments, the first predetermined moisture content threshold may be 40 percent, and the second predetermined moisture content threshold may be 30 percent.

In some embodiments, the foreign objects may include metal, plastic, and/or non-organic material.

In some embodiments, a system for management of municipal solid waste may include: a waste facility configured to receive municipal solid waste, the waste facility may include one or more stockpiles including municipal solid waste; and a production unit located at the waste facility, the production unit configured to pyrolyze feedstock including the municipal solid waste of the one or more stockpiles.

In some embodiments, the waste facility may include an entrance, and the production unit may be located at or near the entrance.

In some embodiments, the production unit may be configured to be operated by two operators.

In some embodiments, the waste facility may include a pyrolysis stockpile, and wherein the municipal solid waste is transferred from the one or more stockpiles to the pyrolysis stockpile.

In some embodiments, the feedstock may include green waste, brown waste, and/or mixed waste of the municipal solid waste.

In some embodiments, the feedstock may include a plurality of particles of the municipal solid waste, and a size of the plurality of particles may be reduced and/or a moisture content of the feedstock may be reduced before the feedstock is pyrolyzed by the production unit.

In some embodiments, when the production unit pyrolyzes the feedstock, the production unit may be configured to generate biochar.

In some embodiments, the biochar may be transferred to storage located at the waste facility.

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Figure 1A:
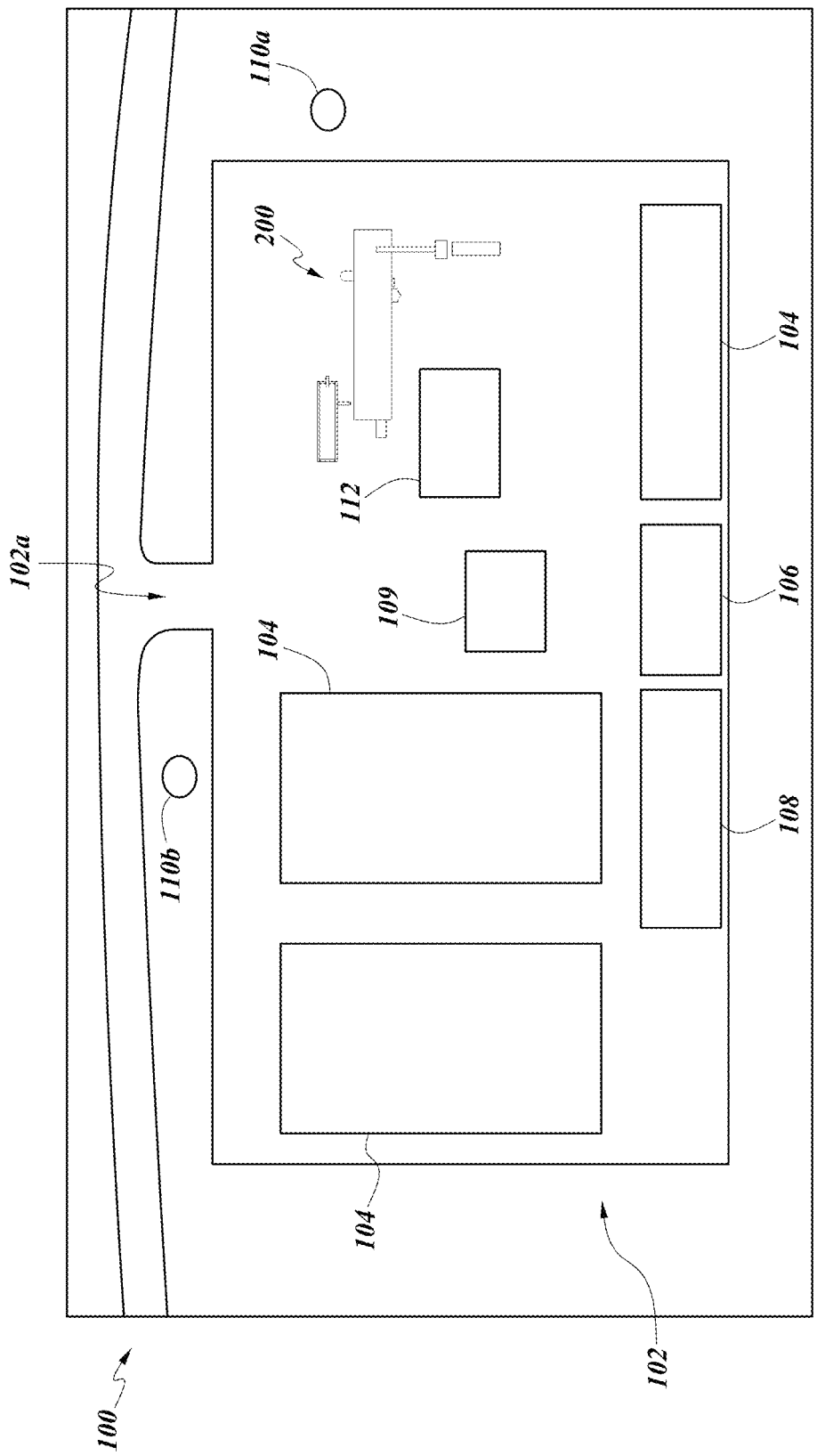
FIGS. 1A and 1B illustrates a schematic of a system for managing municipal solid waste via pyrolysis.

Although several embodiments, examples, and illustrations are disclosed below, it will be understood by those of ordinary skill in the art that the system, methods, and devices described herein extend beyond the specifically disclosed embodiments, examples, and illustrations and includes other uses of the system, methods, and devices and obvious modifications and equivalents thereof. Embodiments of the disclosure are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the disclosure. In addition, embodiments of the disclosure can comprise several novel features and no single feature is solely responsible for its desirable attributes or is essential to practicing the system, methods, and devices herein described.

When municipal solid waste (MSW) is received at a waste facility for processing, the MSW is typically processed by mulching the MSW, composting the MSW, landfilling the MSW and/or incinerating the MSW. In order to mulch or compost MSW, the MSW may be transported from the waste facility to a separate mulching or composting facility. The MSW may be transported via trucks or other transportation equipment to the separate mulching or composting facility. The trucks or other transportation equipment may use gas, for example diesel gas, to operate and may emit exhaust that includes fossil fuel emissions. In addition to the time it takes to transport the MSW from the waste facility to the separate mulching or composting facility, mulching MSW may take about 1 day to about 5 days to complete and composting MSW may take about 50 to about 120 days to complete.

During the mulching or composting process, the MSW may release harmful emissions into the atmosphere and the MSW may release unpleasant odors. The separate mulching or composting facility may release harmful emissions and may produce high levels of noise up to about 110 decibels. In order to process MSW, a mulching facility may require about 0.5 acres, while a composting facility may require about 0.66 acres to process about 1,820 tons of MSW per year, or about 2,750 tons annually per acre. After the MSW is processed, the mulch or compost may weigh substantially the same weight as the MSW that was originally transported to the separate mulching or composting facility.

The mulch or compost may be transported back to the waste facility or transported to be used for landscaping, gardening, or the like. The mulch or compost may release emissions and unpleasant odors while the mulch remains at the waste facility or the separate mulching or composting facility.

Additionally, transporting the MSW from the waste facility to the separate mulching or composting facility, and transporting the mulch or compost back to the waste facility, or to a location where the mulch or compost may be used for landscaping, gardening, or the like, may promote the propagation or proliferation of invasive species or pathogens.

In accordance with several embodiments, processing MSW via pyrolysis to generate or produce biochar as described herein may reduce or eliminate emissions, costs, time, transportation, noise, and/or propagation or proliferation of invasive species or pathogens, when compared to mulching or composting. In some embodiments, a production unit configured to pyrolyze MSW may be operated by one and/or two users or operators which may reduce the cost of labor when compared to mulching or composting. The production unit may produce less noise when compared to mulching or composting, and may produce noise of 85 decibels or less. The production unit may pyrolyze (i.e., process) the MSW in less than 1 day, and may reduce an amount of time the MSW may release emissions and unpleasant odors before the MSW is processed, when compared to mulching and composting. The production unit may use about 0.1 acres of land and may pyrolyze about 1.67 tons of MSW per hour, or about 14,600 tons of MSW per year.

In some embodiments, locating the production unit at the waste facility may reduce or eliminate the labor, costs, time, and/or emissions associated with transporting MSW to a separate mulching or composting facility and may reduce the propagation or proliferation of invasive species or pathogens. In some embodiments, the production unit configured to pyrolyze MSW may include an afterburner module configured to reduce or eliminate an amount of emissions released into the atmosphere. The production unit may generate or produce biochar that may include a weight about 25 percent of the weight of the MSW, and may sequester carbon for up to about 2000 years. Transporting biochar may cost less and may release less emissions than transporting the mulch or compost produced or generated from a same weight of MSW.

In some embodiments, MSW, and more specifically green and brown waste, may be used as a feedstock for pyrolysis for the purpose of sequestering carbon. Green and brown waste may comprise organic waste, such as, wood, tree trimmings, dry leaves, straw and hay, wood ash, cardboard, paper, table scraps, food scraps, and/or other organic waste. The process may begin with MSW, which may include all domestic refuse and non-hazardous wastes. The green and brown waste may be separated from the MSW. After separation the green and brown waste may undergo drying. If the green and brown waste does not undergo drying, the green and brown waste may be used as feedstock for pyrolysis. If the green and brown waste does undergo drying, the output may be dried waste. The dried waste may be used as feedstock for pyrolysis. Pyrolysis may thermally decompose the green and brown waste or dried waste at high temperatures in a deoxygenated environment. A byproduct of pyrolysis may be biochar. Biochar is the charcoal produced by pyrolysis of biomass. The process of managing green and brown waste may be optimized to maximize the output of biochar.

In some embodiments, separation may occur prior to the collection of the MSW or after the collection of the MSW. In some municipalities, households are required to dispose of green and brown waste separate from the rest of the MSW. If the green and brown waste is already separated by the household, separation may not be necessary after the collection of the MSW. In embodiments, the green and brown waste may be collected by the municipality and the green and brown waste may be collected for pyrolysis from the municipality. In some embodiments, the green and brown waste may be collected for pyrolysis directly from the household.

If the green and brown waste is mixed with the rest of the MSW when the MSW is collected, the green and brown waste may undergo separation. In some embodiments, the MSW may be collected by the municipality and separation may be performed at an existing MSW processing plant. In some embodiments, MSW may be collected from the household directly, and separation may be performed onsite at a pyrolysis plant or other location at which the pyrolysis process may be carried out. In some embodiments, after separation, MSW other than the green and brown waste may be transported to the municipality.

In some embodiments, pyrolysis may be performed directly at one or more existing MSW processing plants. One or more mobile pyrolysis plants may be placed at the one or more existing MSW processing plants, allowing for rapid adoption of pyrolysis for the purpose of managing MSW and sequestering carbon from green and brown waste. Mobile pyrolysis plants also reduce a time and cost associated with shipping the green and brown waste from MSW processing plants to pyrolysis plants. In some embodiments, green and brown waste may be shipped from multiple different municipalities to the pyrolysis plant.

In some embodiments, the green and brown waste may have a moisture content. The moisture content may be a percentage of water in the green and brown waste. In some embodiments, the moisture content of the green and brown waste may be about 20% to about 50%. In some embodiments, the green and brown waste may undergo a drying process in order to reduce the moisture content of the green and brown waste below a threshold for pyrolysis. The threshold may be from about 0% moisture to about 30% moisture. In some embodiments, the outcome of the drying process may be dried waste. In some embodiments, the moisture content of the dried waste may be less than the threshold for pyrolysis. In some embodiments, the green and brown waste may have a moisture content below the threshold for pyrolysis, and the green and brown waste may not undergo the drying process. The drying process may comprise at least one of mechanical extraction, such as crushing, dehumidification, or aeration warming. In some embodiments, excess heat produced from the pyrolysis process may be used for drying the green and brown waste.

In some embodiments, when the moisture content of the green and brown waste or the dried waste is below the threshold for pyrolysis, the green and brown waste or the dried waste may be sent to a pyrolysis plant to undergo pyrolysis. Pyrolysis may thermally decompose the green and brown waste. Pyrolysis may occur when high heat is applied to the green and brown waste in an environment with little to no oxygen. The environment may be a vacuum. Optionally, pressure may be applied to the green and brown waste. In some instances, applying pressure may decrease a temperature required to thermally decompose the green and brown waste. In some embodiments, propane may be used as a starter for the pyrolysis process. In some embodiments, the propane may be used as a cold starter.

The output of the pyrolysis process may include biochar and other outputs. The other outputs may include syngas/flue gas, tar, water, or other pyrolysis outputs. The output of biochar may comprise about 5% to 35% of an original weight of the green and brown waste. For the purpose of sequestering carbon, the pyrolysis process may be optimized to increase an output of biochar. Maximizing the output of biochar may reduce an overall carbon footprint associated with disposal of green and brown waste. In some embodiments, a temperature, a residence time and/or a heating rate may be manipulated to increase the output of biochar. In some embodiments, the green and brown waste may be heated to temperatures in the range of about 300 degrees Celsius and 800 degrees Celsius. In some embodiments, the green and brown waste may be heated to a temperature of at least 500 degrees Celsius to increase an amount of carbon that may be sequestered by the output of biochar. In some embodiments, the green and brown waste may be heated to a temperature less than 500 degrees Celsius to increase the output of biochar. In some embodiments, the biochar may be conveyed or transported to a biochar stockpile.

In some embodiments, the other outputs may include syngas and heat. In some embodiments, the syngas may be transferred to a thermal oxidizer. In some embodiments, syngas and air from the drying process may be transferred to the thermal oxidizer. In these embodiments, the air and syngas may be thermally oxidized so that an output of the thermal oxidizer is air.

In some embodiments, a size of individual pieces of green and brown waste may be too large for efficient pyrolysis. In these embodiments, the process may further include a size reduction step. The size reduction step may comprise chipping or grinding, where the individual pieces of green and brown waste are fed through a series of one or more moving blades. As the individual pieces of green and brown waste are feed through the one or more moving blades, the one or more moving blades cut the individual pieces of green and brown waste into smaller pieces of green and brown waste. The smaller pieces of green and brown waste dry out faster during the drying process, reducing the power required to dry the green and brown waste. Smaller pieces of green and brown waste may also reduce time and energy required for the pyrolysis process. Smaller pieces of green and brown waste may also increase the output of syngas and/or an amount of carbon in the output of biochar. In some embodiments, larger pieces of green and brown waste may increase the output of biochar. The size of individual pieces of green and brown waste may affect the heating rate of the green and brown waste.

In some embodiments, the pyrolysis process may take place at a plant or waste facility. The plant or waste facility may include at least one stack for treatment or evacuation of the syngas/flue gas. In some embodiments, the pyrolysis process may take place in a fixed-bed reactor, a rotary kiln reactor, a fluidized-bed reactor, a tubular reactor, or any other type of pyrolysis reactor. In some embodiments, a production unit located at the plant or waste facility may pyrolyze MSW.

System for MSW Management

FIG. 1A shows a schematic of a system 100 for managing MSW via pyrolysis. In some embodiments, the system 100 may include or be located at a waste facility 102 that may receive MSW. The waste facility 102 may include a waste dump site, a recycling center, and/or any other waste management facility or processing plant that may receive MSW. The waste facility 102 may include a public waste facility, a municipal waste facility, and/or a privately owned waste facility. The waste facility 102 may be a location designated by regulations, statutes, and/or any other laws of a municipality, county, state, and/or country to receive and dispose of or process MSW produced within a designated geographical area and/or for a designated population. The waste facility 102 may include one or more stockpiles 104. In some embodiments, the one or more stockpiles 104 may include a heterogeneous stockpile that may include the MSW. In some embodiments, the one or more stockpiles 104 may include a yard trash stockpile, a tire stockpile, and/or any other waste stockpile. In some embodiments, the one or more stockpiles 104 may include a pyrolysis stockpile 112, as described further below with reference to FIG. 3. In some embodiments, the pyrolysis stockpile 112 may include a staging stockpile used to sort MSW and/or prepare the MSW for pyrolysis. In some embodiments, the pyrolysis stockpile 112 may include a size that may be smaller than a size of a largest stockpile of the one or more stockpiles 104. In some embodiments, the waste facility 102 may include a contaminate receptacle 106. The contaminate receptacle 106 may be configured to receive contaminated waste, for example, plastics, metals, treated wood, electronics, and any other non-organic matter. In some embodiments, the waste facility 102 may include waste processing equipment 108. The waste processing equipment 108 may include equipment used for moving, transporting, loading, and/or unloading MSW received at the waste facility 102.

Figure 1B:
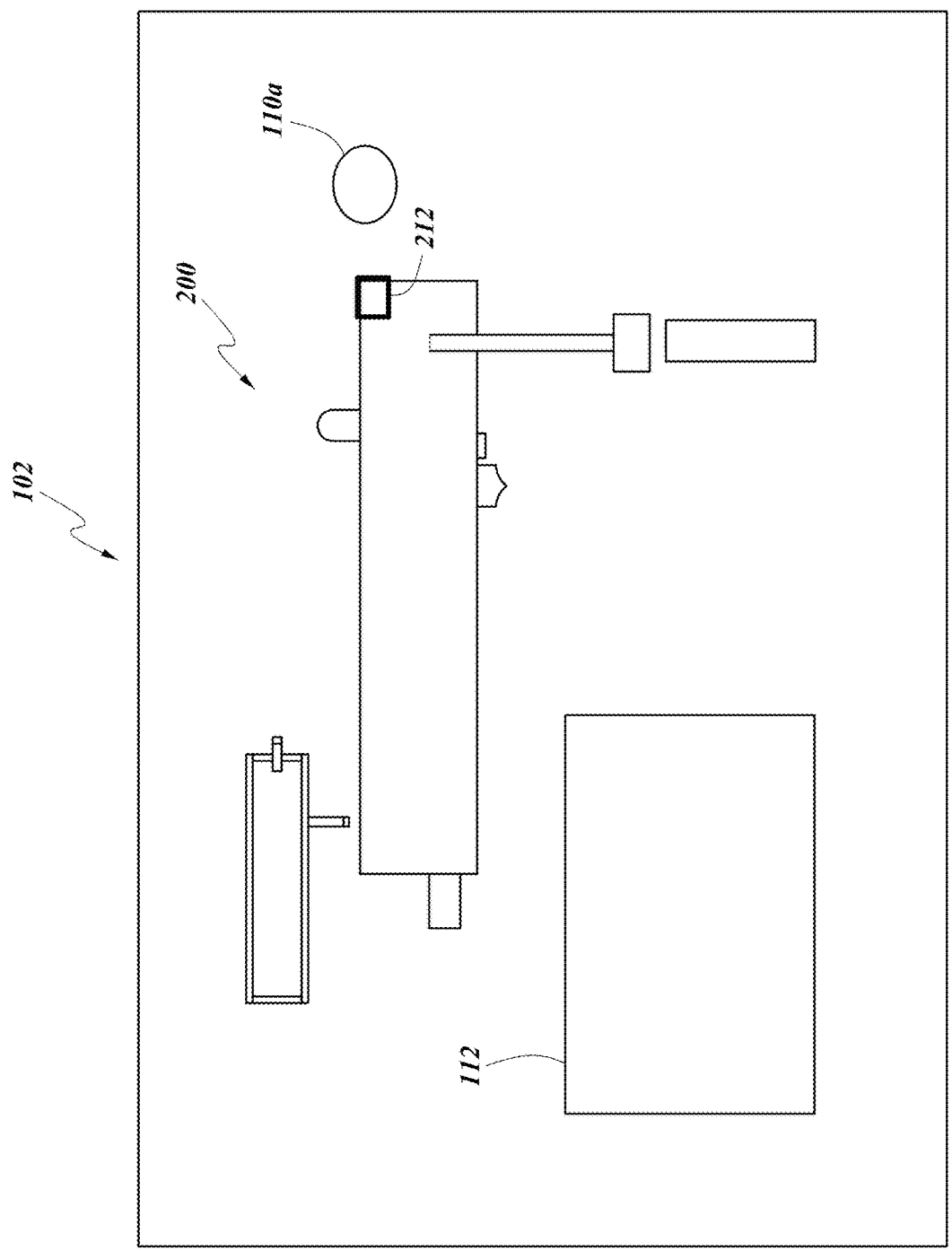

In some embodiments, the system 100 may include a production unit 200. The production unit 200 may be configured to process MSW to produce biochar. The production unit 200 may be located or co-located at the waste facility 102 so MSW may be processed via the production unit 200 at the waste facility 102. In some embodiments, the production unit 200 may be installed at an existing waste facility 102. In some embodiments, the production unit 200 may be installed at a new waste facility 102. In some embodiments, the production unit 200 may be located at or near a MSW drop off or delivery point 109 of the waste facility 102, as shown in FIG. 1B. In some embodiments, the production unit 200 may be positioned to reduce or minimize a distance the MSW may be transported from the delivery point 109 to the one or more stockpiles 104, the pyrolysis stockpile 112, and/or the production unit 200. In some embodiments, the delivery point 109 and/or the production unit 200 may be located or positioned at, next to, or near an entrance 102A of the waste facility 102. In some embodiments, the pyrolysis stockpile 112 and/or the production unit 200 may be separated from the one or more stockpiles 104 by the entrance 102A and/or the delivery point 109. In some embodiments, locating or positioning the production unit 200 at, next to, or near the entrance 102A may reduce or minimize a distance biochar generated or produced by the production unit 200 is transported.

In some embodiments, the production unit 200 may be positioned a distance from the one or more stockpiles 104 of about 10 feet, about 20 feet, about 40 feet about 50 feet, about 60 feet, about 70 feet, about 80 feet, about 90 feet, about 100 feet, about 110 feet, about 120 feet, about 140 feet, about 150 feet, about 160 feet, about 170 feet, about 180 feet, about 190 feet, about 200 feet, about 300 feet, and/or any value between the aforementioned values. In some embodiments, the distance may include a distance between about 10 feet and about 200 feet. In some embodiments, the distance may include a distance between about 50 feet and about 150 feet.

In some embodiments, the production unit 200 may be positioned a distance from the delivery point 109 of about 10 feet, about 20 feet, about 40 feet about 50 feet, about 60 feet, about 70 feet, about 80 feet, about 90 feet, about 100 feet, about 110 feet, about 120 feet, about 140 feet, about 150 feet, and/or any value between the aforementioned values. In some embodiments, the distance may include a distance between about 10 feet and about 150 feet. In some embodiments, the distance may include a distance between about 50 feet and about 100 feet.

In some embodiments, the pyrolysis stockpile 112 may be positioned a distance from the production unit 200 of about 5 feet, about 10 feet, about 15 feet, about 20 feet, about 25 feet, about 30 feet, about 40 feet, about 50 feet, and/or any value between the aforementioned values. In some embodiments, the distance may include a distance between about 5 feet and about 50 feet. In some embodiments, the distance may include a distance between about 5 feet and about 20 feet.

In some embodiments, the production unit 200 may include a mobile production unit. In some embodiments, at least a portion of the production unit 200 may be built or located in a shipping container or other container so the production unit 200 may be transported to the waste facility 102 for installation. In some embodiments, the production unit 200 may be configured or designed to be permanently installed at the waste facility 102. In some embodiments, the production unit 200 may include a thermochemical system as described in U.S. Pat. No. 10,907,827, which is incorporated herein by reference.

In some embodiments, processing MSW at the waste facility 102 via the production unit 200 may reduce or minimize transportation of the MSW from the waste facility 102 to a landfill, an incinerator, and/or a second waste facility in order to process or manage the MSW. By reducing or minimizing transportation of the MSW from the waste facility 102, processing MSW via the production unit 200 at the waste facility 102 may reduce or minimize transportation costs, emissions from transportation equipment, such as diesel trucks, and/or a time between when the waste facility 102 receives the MSW and when the MSW is processed.

In some embodiments, power may be provided to the waste facility 102 and/or the production unit 200 via a power source 110. The power source 110 may include an overhead power line, an underground power line, a generator, a solar panel, a battery and/or any other power source. In some embodiments, if the production unit 200 is installed at an existing waste facility 102 the power source 110 may be positioned at a first position 110A at or near the production unit 200 so the power source 110 may be coupled to or connected to a power connection 212 of the production unit 200, as shown in FIG. 1B. In some embodiments, the production unit 200 may include the power source 110, for example, the production unit 200 may include a generator, a solar panel, a battery, or the like.

In some embodiments, if the production unit 200 is installed at an existing waste facility 102 the power source 110 may be located at a second position 110B. The second position 110B may include a position at the waste facility 102 that may be too far away from the production unit 200 to connect the power source 110 to the production unit 200, or the second position 110B may include a position on an opposite side of an entrance 102A to the waste facility 102 from the production unit 200. In these embodiments, the power source 110 may be moved or relocated from the second position 110B to the first position 110A so the power source 110 may be connected to the production unit 200.

Figure 2:
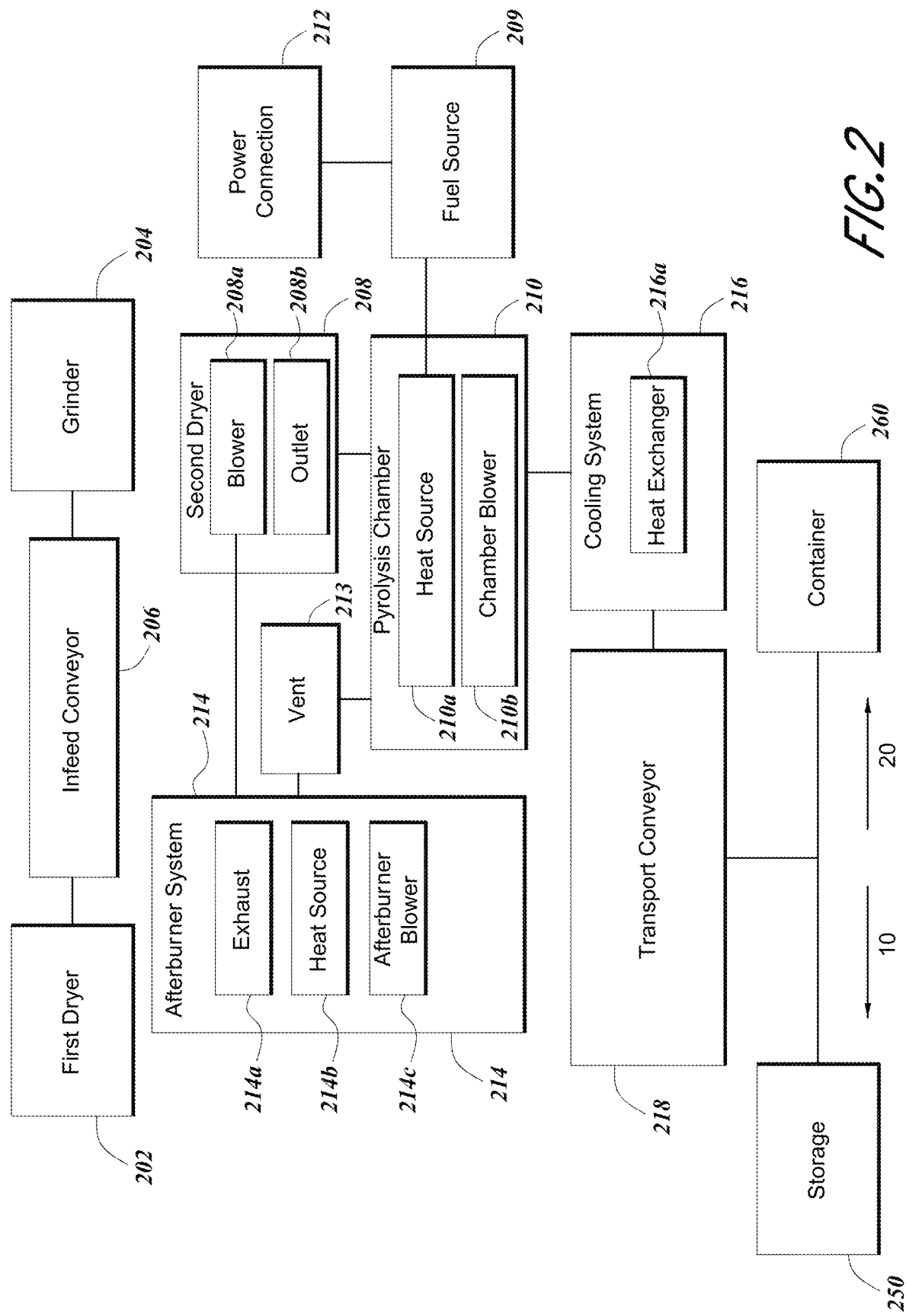
FIG. 2 illustrates a schematic of a production unit if the system of FIGS. 1A and 1B.

FIG. 2 shows a schematic of the production unit 200. As described above, the production unit 200 may be configured to process feedstock to generate or produce biochar. In some embodiments, the feedstock may be transferred to the production unit 200 from the one or more stockpiles 104 and/or the pyrolysis stockpile 112. In some embodiments, the feedstock may include MSW. In some embodiments, MSW may include MSW as defined in 40 CFR § 60.1465 or 40 CFR § 60.51b. In some embodiments, MSW may include solid waste as defined in 40 CFR § 258.2. The MSW may include green waste and/or brown waste, and/or mixed waste. In some embodiments, green waste may include yard waste, vegetative material, and/or any other wet or high nitrogen materials, for example, leaves, grass, food scraps, coffee grounds, manure, or the like. In some embodiments, yard waste may include yard waste as defined in 40 CFR § 60.1465 or 40 CFR § 60.51b. In some embodiments, brown waste may include untreated lumber, wood waste, and/or tree waste, for example, dried leaves, wood chips, straw, sawdust, corn stalks, newspaper, cardboard, or the like. In some embodiments, clean lumber may include untreated lumber as defined in 40 CFR § 60.1465 or 40 CFR § 60.51b. In some embodiments, wood waste may include clean wood as defined in 40 CFR § 60.51b. Mixed waste may include waste or materials that may include green waste and brown waste that may not be physically separated into separated green waste and brown waste due to a size of the mixed waste, commingling of the green waste and brown waste, and/or any other factor that may impact physical separation of the green waste and brown waste.

In some embodiments, one or more features or functions of the production unit 200 may be performed automatically by the production unit 200. In some embodiments, one or more features or functions of the production unit 200 described below may be performed manually by a user (i.e., operator). In some embodiments, one or more features or functions of the production unit 200 may be performed by one (1) user, two (2) users, three (3) users, four (4) users, and/or five (5) users.

In some embodiments, the production unit 200 may include a first dryer 202. The first dryer 202 may be configured to dry feedstock and/or reduce a moisture content of feedstock below a moisture threshold. The first dryer 202 may include a container (i.e., a trough, a hopper, etc.) configured to expose the feedstock to airflow. In some embodiments, a bottom surface of the first dryer may be raised or elevated a distance from a surface below the first dryer 202 (i.e., the ground) so the bottom surface of the first dryer 202 and/or the feedstock at the bottom of the first dryer 202 may be exposed to airflow.

In some embodiments, the feedstock may be turned or agitated when the feedstock is in the first dryer 202. In some embodiments, the feedstock may be manually turned or agitated by the user, for example, via a shovel or other equipment. In some embodiments, the first dryer 202 may include a turning mechanism configured to automatically turn or agitate the feedstock. The turning mechanism may continuously turn the feedstock and/or periodically turn the feedstock. Turning or agitating the feedstock may decrease a time for the moisture content of the feedstock to decrease below the moisture threshold by increasing an amount of airflow the feedstock is exposed to when the feedstock is in the first dryer 202. In some embodiments, turning the feedstock may break apart clumps of the particles of the feedstock and/or prevent or inhibit the particles of the feedstock from clumping together so the time for the moisture content of the particles of the feedstock to decrease below the moisture threshold may be substantially a same amount of time for each particle of the feedstock.

In some embodiments, the first dryer 202 may include a cover. The cover may translate, rotate, or slide between an open position and a closed position. When the cover is in the open position, the cover may not cover the opening and feedstock may be inserted into the first dryer 202. When the cover is in the closed position, the cover may cover the opening. The cover may be configured to prevent or inhibit moisture from entering the first dryer 202 and increasing the moisture content of the feedstock, for example, when the feedstock is left in the first dryer 202 overnight or when weather or precipitation (i.e., rain, snow, etc.) may increase the moisture content of the feedstock.

In some embodiments, the production unit 200 may include a grinder 204. In some embodiments, the grinder 204 may include a disc chipper, a drum chipper, and/or any other grinder or chipper. The grinder 204 may be configured to chip, grind, crush, or otherwise resize or reduce a size of the particles of feedstock.

In some embodiments, the feedstock may be manually transferred or transported from the first dryer 202 to the grinder 204 by the user. In some embodiments, the production unit 200 may include infeed conveyor 206 configured to transfer or transport the feedstock from the first dryer 202 to the grinder 204, for example, via a shovel or other equipment. The infeed conveyor 206 may include a screw conveyor, an auger conveyor, a belt conveyor, a cleated belt conveyor, and/or any other type of conveyor.

In some embodiments, the infeed conveyor 206 may be coupled or connected to the first dryer 202 so the infeed conveyor 206 can receive the feedstock from the first dryer 202. The infeed conveyor 206 may be configured to automatically transfer or transport the feedstock received from the first dryer 202 to the grinder 204. In some embodiments, the user may manually transfer or transport the feedstock from the first dryer 202 to the infeed conveyor 206, for example, via a shovel or other equipment.

In some embodiments, the production unit 200 may include a second dryer 208. The second dryer 208 may include a pipe, a duct, or other conduit. The feedstock may be fed, transported, or forced through the second dryer 208. In some embodiments, the feedstock may be fed, transported, or forced through the second dryer 208 via a screw conveyor, an auger conveyor, a belt conveyor, a cleated belt conveyor, and/or any other type of conveyor.

In some embodiments, the second dryer 208 may be configured to dry the feedstock and/or reduce the moisture content of the feedstock. In some embodiments, the second dryer 208 may be positioned above a pyrolysis chamber 210, as described further below. Heat produced from combustion and/or pyrolysis of feedstock in the pyrolysis chamber 210 may be transferred to the feedstock in the second dryer 208. The heat from the pyrolysis chamber 210 may heat the feedstock and moisture in the feedstock so the moisture evaporates or vaporizes.

In some embodiments, the second dryer 208 may include a blower 208A. In some embodiments, the blower 208A may be configured to force, blow, or propel heat from the pyrolysis chamber 210 into the second dryer 208. In some embodiments, the blower 208A may be configured to force, blow, or propel heat from an afterburner system 214 into the second dryer 208. The heat from the pyrolysis chamber 210 and/or the heat from the afterburner system 214 may heat the feedstock so the moisture in the feedstock evaporates or vaporizes.

In some embodiments, the second dryer 208 may include an outlet 208B. The outlet 208B may be configured to remove evaporated or vaporized moisture from the second dryer 208 and/or the evaporated or vaporized moisture may flow out of the second dryer 208 via the outlet 208B. The outlet 208B may prevent or inhibit the evaporated or vaporized moisture from remaining in the second dryer 208 so the evaporated or vaporized moisture does not prevent or inhibit additional moisture in the feedstock from evaporating or vaporizing.

In some embodiments, the hot exhaust and/or gas may cool as the hot exhaust and/or gas transfers heat to the feedstock. The outlet 208B may be configured to remove cooled exhaust and/or gas from the second dryer 208 and/or the cooled exhaust or gas may flow out of the second dryer 208 via the outlet 208B. In some embodiments, as the outlet 208B removes the cooled exhaust and/or gas from the second dryer 208 and/or the cooled exhaust or gas flows out of the second dryer 208 via the outlet 208B, the blower 208A may force, blow, or propel additional heat into the second dryer 208.

In some embodiments, the production unit 200 may include a pyrolysis chamber 210. The feedstock may be transferred from the second dryer 208 to the pyrolysis chamber 210. In some embodiments, the second dryer 208 may be coupled to or connected to the pyrolysis chamber 210 so the feedstock may be transferred from the second dryer 208 to the pyrolysis chamber 210. In some embodiments, the second dryer 208 may be positioned above the pyrolysis chamber 210 so the feedstock may fall from the second dryer 208 into the pyrolysis chamber 210. In some embodiments, the user may manually transfer the feedstock from the second dryer 208 to the pyrolysis chamber 210, for example, via a shovel or other equipment. In some embodiments, a screw conveyor, an auger conveyor, a belt conveyor, a cleated belt conveyor, and/or any other type of conveyor may be configured to transfer the feedstock from the second dryer 208 to the pyrolysis chamber 210. In some embodiments, the pyrolysis chamber 210 may include a screw conveyor, an auger conveyor, a belt conveyor, a cleated belt conveyor, and/or any other type of conveyor configured to transport or move the feedstock through the pyrolysis chamber 210. In some embodiments, the pyrolysis chamber 210 may be configured to hold feedstock in the pyrolysis chamber for a residence time. In some embodiments, the residence time may be based on a temperature in the pyrolysis chamber 210, a moisture content of the feedstock, and/or any other factor.

In some embodiments, the pyrolysis chamber 210 may be configured to pyrolyze the feedstock to generate or produce biochar. In some embodiments, the pyrolysis chamber 210 may pyrolyze the feedstock when the temperature in the pyrolysis chamber 210 is above a pyrolysis temperature threshold. In some embodiments, the pyrolysis temperature threshold may include a temperature of about 350° C., about 355° C., about 360° C., about 365° C., about 370° C., about 375° C., about 380° C., about 385° C., about 390° C., about 395° C., about 400° C., about 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about and/or any value between the aforementioned values. In some embodiments, the pyrolysis temperature threshold may include a temperature between about 350° C. and about 550° C. In some embodiments, the pyrolysis temperature threshold may include a temperature between about 385° C. and about 500° C.

In some embodiments, the pyrolysis chamber 210 may include a heat source 210A. In some embodiments, the heat source 210A may be configured to generate heat and/or add heat to the feedstock and/or the pyrolysis chamber 210. In some embodiments, the heat source 210A may include a burner, a burner bar, an electric heating element, and/or any other heat source. In some embodiments, the heat source may be a starter or cold starter for the pyrolysis chamber 210. When the temperature in the pyrolysis chamber 210 is below the pyrolysis temperature threshold, the heat source 210A may be configured to add heat to the pyrolysis chamber 210 in order to increase the temperature in the pyrolysis chamber 210 to a temperature at or above the pyrolysis temperature threshold. In some embodiments, the heat source 210A may be coupled to or connected to a fuel source 209. The fuel source 209 may include liquid fuel, propane, natural gas, electrical energy provided by the connection between the power source 110 and the power connection 212, and/or any other fuel. In some embodiments, the heat source 210A may ignite, burn, combust, and/or otherwise generate heat from the fuel source 209.

In some embodiments, when the temperature in the pyrolysis chamber 210 is below the pyrolysis temperature threshold, heat in the pyrolysis chamber 210 and/or heat generated by the heat source 210A may partially pyrolyze the feedstock to generate or produce partially processed feedstock. Heat generated when the feedstock partially pyrolyzes may heat the pyrolysis chamber 210 and/or increase the temperature in the pyrolysis chamber 210. In some embodiments, the fuel source 209 may be configured to turn off when the temperature in the pyrolysis chamber 210 reaches or increases above the pyrolysis temperature threshold. In some embodiments, the user may turn off the fuel source 209 and/or the fuel source 209 may automatically turn off when the temperature in the pyrolysis chamber 210 reaches or increased above the pyrolysis temperature threshold.

In some embodiments, when the temperature in the pyrolysis chamber 210 is at or above the pyrolysis temperature threshold, the feedstock in the pyrolysis chamber 210 may pyrolyze to form biochar. In some embodiments, pyrolyzing the feedstock may generate heat and/or one or more outputs. The one or more outputs may include syngas, flue gas, tar, bio-oil, water, volatile organic compounds, and/or other pyrolysis outputs. In some embodiments, the one or more outputs may be ignited, burned and/or combusted in the pyrolysis chamber 210 to generate heat and/or maintain the temperature in the pyrolysis chamber 210 above the pyrolysis temperature threshold as additional feedstock is transported or moved through the pyrolysis chamber 210. In some embodiments, the one or more outputs may ignite, burn, and/or combust when the one or more outputs are exposed to the temperature to generate heat in the pyrolysis chamber 210. In some embodiments, the heat generated when the one or more outputs ignite, burn, and/or combust may maintain the temperature in the pyrolysis chamber 210 at or above the pyrolysis temperature. In some embodiments, the heat source 210A may be configured to ignite, burn, and/or combust at least a portion of the one or more outputs to generate heat in to maintain the temperature in the pyrolysis chamber 210 at or above the pyrolysis temperature threshold.

In some embodiments, the pyrolysis chamber 210 may include a chamber blower 210B. The chamber blower 210B may be configured to add or introduce air into the pyrolysis chamber 210. In some embodiments, production unit 200, the pyrolysis chamber 210, and/or the chamber blower 210B may be configured to control an amount of air the chamber blower 210B may add or introduce into the pyrolysis chamber 210. The chamber blower 210B may be configured to control an amount of the one or more outputs that are ignited, burned and/or combusted in the pyrolysis chamber 210 by modifying the amount of air the chamber blower 210B adds or introduce into the pyrolysis chamber 210. The chamber blower 210B may control the temperature in the pyrolysis chamber 210 to maintain the temperature in the pyrolysis chamber 210 at or above the pyrolysis temperature threshold. In some embodiments, the chamber blower 210B may control the temperature in the pyrolysis chamber 210 to maintain the temperature in the pyrolysis chamber 210 at or below a maximum temperature threshold. In some embodiments, the maximum temperature threshold may include a temperature of about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., about 700° C., about 710° C., about 720° C., about 730° C., about 740° C., about 750° C., about 760° C., about 770° C., about 780° C., about 790° C., about 800° C., and/or any value between the aforementioned values. In some embodiments, the maximum temperature threshold may include a temperature between about 600° C. and about 750° C. In some embodiments, the maximum temperature threshold may include a temperature between about 650° C. and about 700° C.

In some embodiments, the temperature in the pyrolysis chamber 210 may be maintained within an operating temperature range. In some embodiments, the operating temperature range may include a temperature between the pyrolysis temperature threshold and the maximum temperature threshold. In some embodiments, the operating temperature range may include a temperature between about 385° C. and about 700° C. In some embodiments, the operating temperature ranger may include a temperature between about 500° C. and about 650° C.

In some embodiments, the pyrolysis chamber 210 may include minimal or no oxygen so the pyrolysis chamber 210 may be a vacuum or substantially a vacuum. In some embodiments, pressure may be applied to the feedstock when the feedstock is in the pyrolysis chamber 210. Applying pressure to the feedstock may decrease the temperature in the pyrolysis chamber 210 required to pyrolyze the feedstock may be decreased. In some embodiments, applying pressure to the feedstock may decrease the pyrolysis temperature threshold, the maximum temperature threshold, and/or the operating temperature range.

In some embodiments, the production unit 200 may include an afterburner system 214. The afterburner system 214 may be configured to ignite, burn, and/or combust at least a portion of the one or more outputs that are not ignited, burned, and/or combusted in the pyrolysis chamber 210. In some embodiments, the afterburner system 214 may be configured to generate heat from igniting, burning, and/or combusting at least the portion of the one or more outputs. In some embodiments, the heat generated in the afterburner system 214 may be supplied to the first dryer 202 and/or the second dryer 208.

In some embodiments, the afterburner system 214 may be connected to or coupled to the pyrolysis chamber 210 via a vent 213. In some embodiments, the vent 213 may allow air, gas, fluid, and/or the one or more outputs to flow from the pyrolysis chamber 210 to the afterburner system 214. In some embodiments, the vent 213 may open and/or close to control a flow rate of the air, gas, fluid, and/or the one or more outputs from the pyrolysis chamber 210 to the afterburner system 214.

In some embodiments, the afterburner system 214 may include an exhaust 214A. The exhaust 214A may vent or release heat and/or the one or more outputs to the atmosphere. In some embodiments, the afterburner system 214 may be configured to ignite, burn, and/or combust at least the portion of the one or more outputs to reduce an amount of syngas, flue gas, tar, bio-oil, volatile organic compounds, and/or any other toxic or harmful outputs that are vented or released to the atmosphere via the exhaust 214A.

In some embodiments, the afterburner system 214 may include a heat source 214B configured to ignite, burn, and/or combust at least the portion of the one or more outputs that are not ignited, burned, and/or combusted in the pyrolysis chamber 210. The heat source 214B may include a burner, a burner bar, an electric heating element, and/or any other heat source. In some embodiments, the heat source 214B may ignite, burn, combust, and/or otherwise generate heat from the fuel source 209 to ignite, burn and/or combust at least the portion of the one or more outputs that are not ignited, burned, and/or combusted in the pyrolysis chamber 210.

In some embodiments, the afterburner system 214 may include an afterburner blower 214C. The afterburner blower 214C may be configured to add or introduce air into the afterburner system 214. In some embodiments, the afterburner blower 214C, the chamber blower 210B, and/or the vent 213 may generate a draft. The draft may direct, draw, or force the air, gas, fluid, and/or the one or more outputs from the pyrolysis chamber 210 through the vent 213 and into the afterburner system 214. In some embodiments, the draft may direct, draw, or force heat and/or the one or more outputs in the afterburner system 214 through the exhaust 214A and to the atmosphere.

In some embodiments, the production unit 200 may include a cooling system 216. The cooling system 216 may be configured to decrease a temperature of the biochar and/or the partially processed feedstock or cool the biochar and/or the partially processed feedstock. The cooling system 216 may include a pipe, a duct, or other conduit. In some embodiments, the biochar and/or the partially processed feedstock may be fed or transported through the cooling system 216 via a screw conveyor, an auger conveyor, a belt conveyor, a cleated belt conveyor, and/or any other type of conveyor.

In some embodiments, the cooling system 216 may be coupled to or connected to the pyrolysis chamber 210 so the biochar and/or the partially processed feedstock generated or produced in the pyrolysis chamber 210 may be transferred to the cooling system 216. In some embodiments, the pyrolysis chamber 210 may be positioned above the cooling system 216 so the biochar and/or the partially processed feedstock may fall from the pyrolysis chamber 210 into the cooling system 216. In some embodiments, the user may manually transfer the biochar and/or the partially processed feedstock from the pyrolysis chamber 210 to the cooling system 216, for example, via a shovel or other equipment. In some embodiments, a screw conveyor, an auger conveyor, a belt conveyor, a cleated belt conveyor, and/or any other type of conveyor may be configured to transfer the feedstock from the pyrolysis chamber 210 to the cooling system 216.

In some embodiments, the cooling system 216 may include a heat exchanger 216A configured to draw or remove heat from the biochar and/or the partially processed feedstock. In some embodiments, the heat exchanger 216A may include a blower configured to blow air into and/or through the cooling system 216. The air blown into and/or through the cooling system 216 may include a temperature less than a temperature of the biochar and/or the partially processed feedstock so the air may draw or remove heat from the biochar and/or the partially processed feedstock. In some embodiments, the heat exchanger 216A may be configured to spray or otherwise apply water or any other liquid to the biochar and/or the partially processed feedstock to decrease a temperature of or cool the biochar and/or the partially processed feedstock.

In some embodiments, the production unit 200 may include a transport conveyor 218. In some embodiments, the transport conveyor 218 may include a screw conveyor, an auger conveyor, a belt conveyor, a cleated belt conveyor, and/or any other type of conveyor. In some embodiments, the transport conveyor 218 may be configured to transfer or transport the biochar and/or the partially processed feedstock from the production unit 200 and/or the cooling system 216 to storage 250. In some embodiments, the transport conveyor 218 may be configured to transfer or transport the biochar and/or the partially processed feedstock from the production unit 200 and/or the cooling system 216 in a container 260.

In some embodiments, the transport conveyor 218 may be configured to move in a first direction 10 and/or a second direction 20 opposite the first direction 10. The transport conveyor may be configured to move in the first direction 10 to transfer or transport the biochar and/or the partially processed feedstock from the production unit 200 and/or the cooling system 216 to the storage 250. The transport conveyor 218 may be configured to move in the second direction 20 to transfer or transport the biochar and/or the partially processed feedstock from the production unit 200 and/or the cooling system 216 to the container 260. In some embodiments, the transport conveyor 218 may be configured to transfer or transport biochar to the storage 250 and transfer or transport partially processed feedstock to the container 260.

In some embodiments, the transport conveyor 218 may be configured to move in the first direction 10 when the temperature in the pyrolysis chamber 210 is at or above the pyrolysis temperature threshold. In some embodiments, the transport conveyor 218 may be configured to move in the first direction 10 when biochar is transferred from the cooling system 216 to the transport conveyor 218.

In some embodiments, the transport conveyor 218 may be configured to move in the second direction 20 when the temperature in the pyrolysis chamber 210 is below the pyrolysis temperature threshold. In some embodiments, the transport conveyor 218 may be configured to move in the second direction 20 when partially processed feedstock is transferred from the cooling system 216 to the transport conveyor 218.

In some embodiments, the user may change a direction of the transport conveyor 218 from the second direction 20 to the first direction 10 when the temperature in the pyrolysis chamber 210 is at or above the pyrolysis temperature threshold and/or when biochar is transferred from the cooling system 216 to the transport conveyor 218. In some embodiments, the production unit 200 and/or the transport conveyor 218 may automatically change a direction of the transport conveyor 218 from the second direction 20 to the first direction 10 when the temperature in the pyrolysis chamber 210 is at or above the pyrolysis temperature threshold and/or when biochar is transferred from the cooling system 216 to the transport conveyor 218.

In some embodiments, biochar may be transferred or transported to the storage 250 so the biochar may be sequestered. In some embodiments, partially processed feedstock may be transferred to the container 260 so the partially processed feedstock may be mixed or combined with feedstock from the pyrolysis stockpile 112 and/or used as feedstock for the production unit 200.

Figure 3:
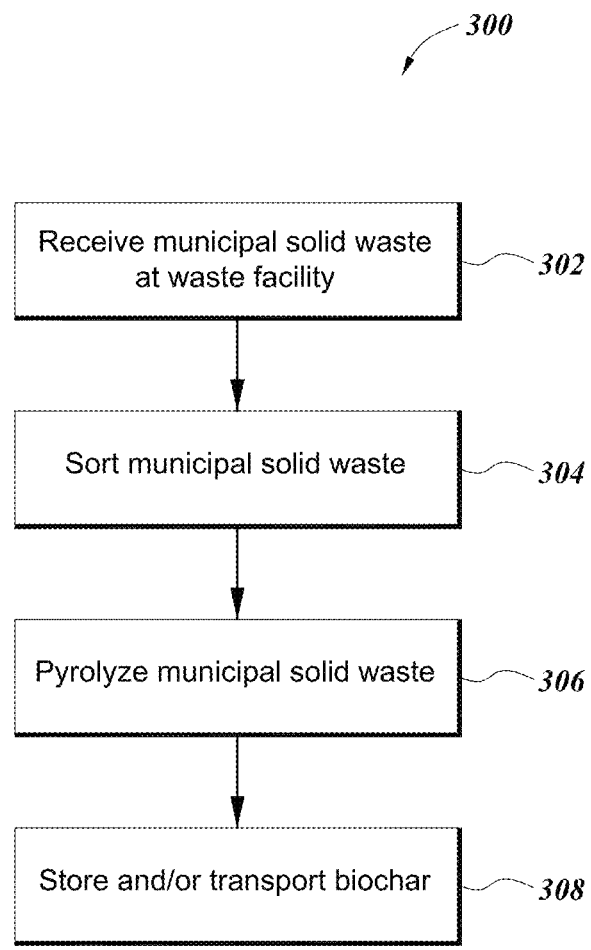
FIG. 3 illustrates a flow diagram of a method for managing municipal solid waste to sequester carbon.

FIG. 3 shows a process diagram of a method 300 for managing MSW to sequester carbon. In some embodiments, at step 302, MSW may be received at a waste facility 102. The MSW may be delivered to the waste facility 102 by individuals, municipal haulers, and/or commercial haulers. In some embodiments, the MSW may be transferred from the individuals, municipal haulers, and/or commercial haulers to one or more stockpiles 104 via the waste processing equipment 108 at the waste facility 102. In some embodiments, the MSW may be transferred from the individuals, municipal haulers, and/or commercial haulers to the one or more stockpiles 104 manually by a user. In some embodiments, as described above with reference to FIG. 1A, the one or more stockpiles 104 may include a heterogeneous stockpile that may include all of the MSW received at the waste facility 102.

In some embodiments, at step 304, the MSW may be sorted. In some embodiments, the MSW may be sorted by the user. The user may inspect or analyze the MSW (i.e., the one or more stockpiles 104) to identify contaminants (i.e., foreign objects) included in the MSW. In some embodiments, the contaminants may include non-organic matter including plastics, metals, treated wood, electronics, and/or any other non-organic matter or waste. The use may remove identified contaminants from the one or more stockpiles 104 of MSW. In some embodiments, the identified contaminants may be disposed of or processed according to practices, regulations, statutes, and/or any other laws of a municipality, county, state, and/or country where the waste facility 102 is located.

In some embodiments, after the identified contaminants are removed from the one or more stockpiles 104 of MSW, the MSW may sorted or categorized by a waste classification of each particle of the MSW. The waste classifications may include green waste, brown waste, and/or mixed waste. As described above with reference to FIG. 1A, green waste may include yard waste, vegetative material, and/or any other wet or high nitrogen materials, for example, leaves, grass, food scraps, coffee grounds, manure, or the like. Brown waste may include untreated lumber, wood waste, and/or tree waste, for example, dried leaves, wood chips, straw, sawdust, corn stalks, newspaper, cardboard, or the like. Mixed waste may include waste or materials that may include green waste and brown waste that may not be physically separated into separated green waste and brown waste due to a size of the mixed waste, commingling of the green waste and brown waste, and/or any other factor that may impact physical separation of the green waste and brown waste.

In some embodiments, the green waste, the brown waste, and/or the mixed waste may be transferred to the pyrolysis stockpile 112 located at the waste facility 102. In some embodiments, the pyrolysis stockpile 112 may include separate stockpiles for each of the green waste, the brown waste, and the mixed waste.

In some embodiments, at step 306, the MSW (i.e., the green waste, the brown waste, and/or the mixed waste) may be pyrolyzed. The MSW may be used as feedstock for a production unit 200 located at the waste facility 102. In some embodiments, the MSW may be pyrolyzed according to method 400 described below. The output or product of the pyrolysis process may include biochar. In some embodiments, a particular weight of MSW may be pyrolyzed. The biochar generated or produced as a result of the pyrolysis process may include a weight of about twenty-five (25) percent of the particular weight of MSW pyrolyzed at step 306.

In some embodiments, at step 308, the biochar may be stored and/or transported in order to sequester carbon. In some embodiments, as described above with reference to FIG. 2, the biochar may be transferred or transported to storage 250 located at the waste facility 102. In some embodiments, the storage 250 may include one or more movable containers so the biochar may be transferred or transported from the waste facility for sequestering carbon.

Figure 4:
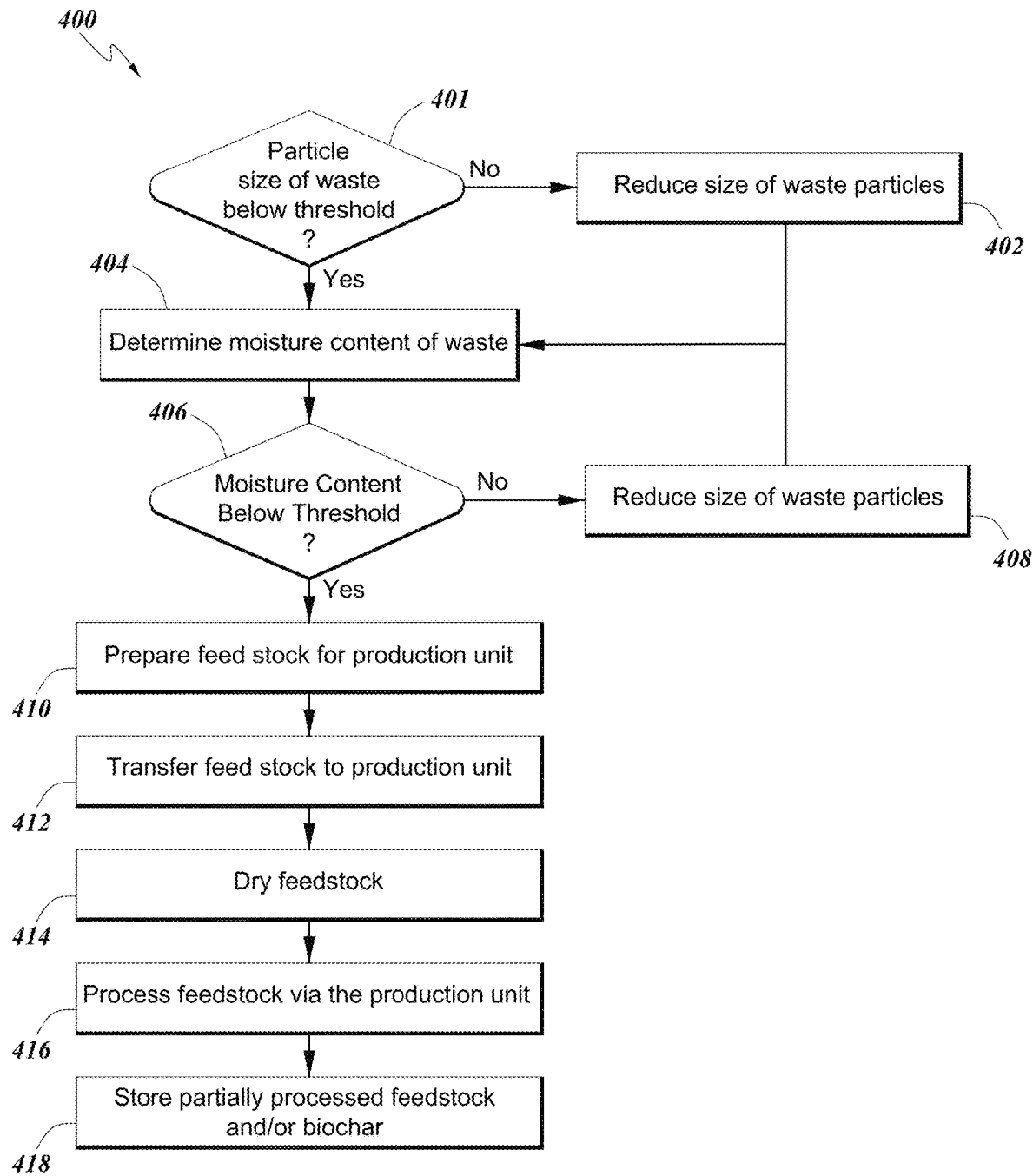
FIG. 4 illustrates a flow diagram of a method for pyrolyzing municipal solid waste with the production unit of FIG. 2 located at a waste facility.

FIG. 4 shows a method 400 pyrolyzing MSW via a production unit 200 located at a waste facility 102. In some embodiments, as described above with reference to FIG. 3, MSW may be received and/or sorted at the waste facility 102 into a pyrolysis stockpile 112.

In some embodiments, at step 401, a user may determine if a size of particles of the green waste, the brown waste, and/or the mixed waste in the pyrolysis stockpile 112 is at or below a feedstock threshold. The size of the particles may include a largest cross-sectional area of the particles. In some embodiments, the feedstock size threshold may include a cross-sectional area of about 0.5 $in^2$, about 1.0 $in^2$, about 1.5 $in^2$, about 2.0 $in^2$, about 2.5 $in^2$, about 3.0 $in^2$, about 3.5 $in^2$, about 4.5 $in^2$, about 5.0 $in^2$, about 10.0 $in^2$, and/or any value between the aforementioned values.

If at step 401, the size of the particles of the green waste, the brown waste, and/or the mixed waste in the pyrolysis stockpile 112 is above the feedstock size threshold, in some embodiments, at step 402, the size of particles of the green waste, the brown waste, and/or the mixed waste in the pyrolysis stockpile 112 may be resized or reduced. In some embodiments, a user may resize or reduce the size of the particles of the green waste, the brown waste, and/or the mixed waste with a disc chipper, a drum chipper, and/or any other grinder or chipper located at the waste facility 102. In some embodiments, the user may resize or reduce the size of the particles of the green waste, the brown waste, and/or the mixed waste manually (i.e., by hand). The size of the particles of the green waste, the brown waste, and/or the mixed waste may be reduced until the size of the particles is at or below the feedstock size threshold.

In some embodiments, at step 404, the user may determine a moisture content of the green waste, the brown waste, and/or the mixed waste in the pyrolysis stockpile 112. In some embodiments, the moisture content may include a percentage of a total volume or a percentage of a total weight of the green waste, the brown waste, and/or the mixed waste that includes a volume or weight of moisture. In some embodiments, the user may separately determine the moisture content of each of the green waste, the brown waste, and/or the mixed waste. The user may determine the moisture content of the green waste, the brown waste, and/or the mixed waste via a moisture content analyzer. The user may place a portion of the green waste, the brown waste, and/or the mixed waste in the moisture content analyzer to determine the moisture content of the green waste, the brown waste, and/or the mixed waste. The moisture content analyzer may be configured to heat the portion of the green waste, the brown waste, and/or the mixed waste in order to dry the portion of the green waste, the brown waste, and/or the mixed waste in the moisture content analyzer. The moisture content analyzer may measure or determine a weight or a volume of the portion of the green waste, the brown waste, and/or the mixed waste before the moisture content analyzer dries the portion of the green waste, the brown waste, and/or the mixed waste and a weight or volume of the portion of the green waste, the brown waste, and/or the mixed waste after the moisture content analyzer dries the portion of the green waste, the brown waste, and/or the mixed waste. The moisture content analyzer may compare the weight or the volume of the portion of the green waste, the brown waste, and/or the mixed waste before the moisture content analyzer dries to portion of the green waste, the brown waste, and/or the mixed waste to the weight or the volume of the portion of the green waste, the brown waste, and/or the mixed waste after the moisture content analyzer dries the portion of the green waste, the brown waste, and/or the mixed waste to determine a moisture content of the portion of the green waste, the brown waste, and/or the mixed waste.

In some embodiments, at step 406, the user may compare the moisture content of the portion of the green waste, the brown waste, and/or the mixed waste to a moisture content threshold. In some embodiments, the moisture content threshold may include a percentage of about 5 percent, about 10 percent, about 15 percent, about 20 percent, about 25 percent, about 30 percent, about 35 percent, about 40 percent, about 45 percent, about 50 percent, about 55 percent, about 60 percent, and/or a value between the aforementioned values. In some embodiments, the moisture content threshold may include a percentage between about 20 percent and about 40 percent.

In some embodiments, if the moisture content of the portion of the green waste, the brown waste, and/or the mixed waste is at or below the moisture content threshold, the user may determine that the moisture content of the green waste, the brown waste, and/or the mixed waste of the pyrolysis stockpile 112 is at or below the moisture content threshold. In some embodiments, if the moisture content of the portion of the green waste, the brown waste, and/or the mixed waste is above the moisture content threshold, the user may determine that the moisture content of the green waste, the brown waste, and/or the mixed waste of the pyrolysis stockpile 112 is above the moisture content threshold.

In some embodiments, if the moisture content of the green waste, the brown waste, and/or the mixed waste of the pyrolysis stockpile 112 is at or below the moisture content threshold, the user may prepare feedstock at step 410.

In some embodiments, if the moisture content of the green waste, the brown waste, and/or the mixed waste of the pyrolysis stockpile 112 is above the moisture content threshold, the user may dry or reduce the moisture content of the green waste, the brown waste, and/or the mixed waste of the pyrolysis stockpile 112 at step 408. The user may dry or reduce the moisture content of the green waste, the brown waste, and/or the mixed waste of the pyrolysis stockpile 112 until the moisture content is at or below the moisture content threshold. In some embodiments, the user may dry or reduce the moisture content of the green waste, the brown waste, and/or the mixed waste of the pyrolysis stockpile 112 with the first dryer 202 of the production unit 200.

In some embodiments, the user may repeat steps 404-408 until the moisture content of the green waste, the brown waste, and/or the mixed waste is at or below the moisture content threshold.

In some embodiments, at step 410, the user may prepare a mixture or feedstock. In some embodiments, if a temperature of a pyrolysis chamber 210 of the production unit 200 is below the pyrolysis temperature threshold, the user may start or startup the production unit 200, and the feedstock may include a startup mixture or startup feedstock. In some embodiments, the user may retrieve brown waste from the pyrolysis stockpile 112 to prepare startup feedstock so the startup feedstock includes only brown waste.

In some embodiments, if the temperature of the pyrolysis chamber 210 of the production unit 200 is at or above the pyrolysis temperature threshold the user may retrieve green waste, brown waste, and/or mixed waste from the pyrolysis stockpile 112. In some embodiments, partially processed feedstock, as described above with reference to FIG. 2, from the container 260 that may be generated by the production unit 200 from the startup feedstock when the temperature in the pyrolysis chamber 210 of the production unit 200 is below the pyrolysis temperature threshold may be mixed with the green waste, brown waste, and/or mixed waste to prepare the feedstock. The user may mix or combine the partially processed feedstock with the green waste, brown waste, and/or mixed waste so a first percentage of the feedstock is partially processed feedstock, and a second percentage of the feedstock is green waste, brown waste, and/or mixed waste.

In some embodiments, the first percentage may include a percentage of about 20 percent, about 25 percent, about 30 percent, about 35 percent, about 40 percent, about 45 percent, about 50 percent, about 55 percent, about 60 percent, and/or any value between the aforementioned values. In some embodiments, the first percentage may include a percentage between about 30 percent and about 50 percent.

In some embodiments, the second percentage may include a percentage of about 40 percent, about 45 percent, about 50 percent, about 55 percent, about 60 percent, about 65 percent, about 70 percent, about 75 percent, about 80 percent, and/or any value between the aforementioned values. In some embodiments, the second percentage may include between about 50 percent and about 70 percent.

In some embodiments, the feedstock may include a first percentage of about 50 percent and a second percentage of about 50 percent so the feedstock includes about 50 percent of partially processed feedstock and about 50 percent of green waste, brown waste, and/or mixed waste. In some embodiments, the feedstock may include a first percentage of about 30 percent and a second percentage of about 70 percent so the feedstock includes about 30 percent of partially processed feedstock and about 70 percent of green waste, brown waste, and/or mixed waste.

In some embodiments, the first percentage may include a percentage of a total weight of the feedstock that includes partially processed feedstock, and the second percentage may include a percentage of the total weight of the feedstock that includes green waste, brown waste, and/or mixed waste. In some embodiments, the first percentage may include a percentage of a total volume of the feedstock that includes partially processed feedstock, and the second percentage may include a percentage of the total volume of the feedstock that includes green waste, brown waste, and/or mixed waste.

In some embodiments, the user may mix or combine the partially processed feedstock with the green waste, brown waste, and/or the mixed waste to prepare feedstock for a predetermined time after the temperature of the pyrolysis chamber 210 of the production unit 200 reaches the pyrolysis temperature threshold. In some embodiments, the predetermined time may include a time until the container 260 includes no partially processed feedstock or substantially no partially processed feedstock. In some embodiments, the predetermined time may include a time of about 0.5 hours, about 1.0 hour, about 1.5 hours, about 2.0 hours, about 2.5 hours, about 3.0 hours, about 3.5 hours, about 4.0 hours, about 4.5 hours, about 5.0 hours, about 10 hours, and/or any value between the aforementioned values. In some embodiments, the predetermined time may include a time between about 1.0 hour and about 5.0 hours. In some embodiments, the predetermined time may include a time between about 2.0 hours and about 4.0 hours.

In some embodiments, at step 412, the feedstock may be transferred to the production unit 200. In some embodiments, the user may transfer the feedstock to the first dryer 202 and the first dryer 202 may be configured to transfer the feedstock to the infeed conveyor 206. In some embodiments, the user may transfer the feedstock to infeed conveyor 206 and/or the production unit 200. In some embodiments, the user may transfer the feedstock to the production unit 200 after the user prepares the feedstock at step 410 and/or the user may prepare the feedstock when the user transfers the feedstock to the production unit 200 (i.e., the user may prepare the feedstock in the first dryer 202 and/or the infeed conveyor 206).

In some embodiments, at step 414, a size of particles of the feedstock may be reduced. The size of the particles of the feedstock may include a largest cross-sectional area of the particles. The grinder 204 of the production unit 200 may reduce the size of the particles of the feedstock. In some embodiments, the size of the particle of the feedstock may be reduced until the size of the particles of the feedstock is at or below a pyrolysis size threshold. In some embodiments, the pyrolysis size threshold may include a cross-sectional of about 0.5 in$^2$, about 1.0 in$^2$, about 1.5 in$^2$, about 2.0 in$^2$, about 2.5 in$^2$, about 3.0 in$^2$, about 3.5 in$^2$, about 4.5 in$^2$, about 5.0 in$^2$, about 10.0 in$^2$, and/or any value between the aforementioned values. In some embodiments, the pyrolysis size threshold may include a cross-sectional area less than the feedstock size threshold.

In some embodiments, at step 416, a moisture content of the feedstock may be reduced until the moisture content of the feedstock is at or below a pyrolysis moisture content threshold. The second dryer 208 may reduce the moisture content of the feedstock until the moisture content of the feedstock is at or below the pyrolysis moisture content threshold. In some embodiments, the pyrolysis moisture content threshold may include a percentage of about 5 percent, about 10 percent, about 15 percent, about 20 percent, about 25 percent, about 30 percent, about 35 percent, about 40 percent, about 45 percent, about 50 percent, about 55 percent, about 60 percent, and/or a value between the aforementioned values. In some embodiments, the pyrolysis moisture content threshold may include a percentage between about 15 percent and about 25 percent.

In some embodiments, at step 418, the feedstock may be processed via the production unit 200. In some embodiments, if the temperature in the pyrolysis chamber 210 of the production unit 200 is below the pyrolysis temperature threshold, the feedstock may include the startup feedstock (i.e., brown waste), and the production unit 200 may generate or produce partially processed feedstock as described above with reference to FIG. 2. In some embodiments, if the temperature in the pyrolysis chamber 210 of the production unit 200 is at or above the pyrolysis temperature threshold, the production unit 200 may generate or produce biochar.

In some embodiments, at step 420, the partially processed feedstock and/or the biochar may be stored. If the production unit 200 generates or produces partially processed feedstock at step 418, the partially processed feedstock may be transferred to the container 260, as described above with reference to FIG. 2. In some embodiments, the partially processed feedstock may be mixed or combined with the green waste, brown waste, and/or mixed waste at step 410. If the production unit 200 generate or produces biochar at step 418, the biochar may be transferred to the storage 250.

As described above, a weight of biochar generated or produced by the production unit 200 may include a weight of about 25 percent of a weight of the feedstock processed by the production unit 200. In some embodiments, about 75 percent of the weight of the feedstock processed by the production unit 200 may be processed to generate or produce heat and/or power that may be used to heat the second dryer 208, the pyrolysis chamber 210 and/or the production unit 200.

Additional Embodiments

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example+5%, +10%, +15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein, but are to be accorded the widest scope consistent with this disclosure, the principles and the novel features disclosed herein.

What is claimed is:

1. A method for management of green and brown waste at a municipal solid waste processing facility, the method comprising the steps of:
   receiving feedstock at the municipal solid waste processing facility, wherein the feedstock is green and brown waste collected separately from other municipal waste, said green and brown waste comprising yard waste and vegetative material, and wherein the feedstock comprises a plurality of particles each having a size;
   inspecting the feedstock for foreign objects;
   drying the feedstock so a moisture content of the feedstock is below a predetermined moisture content threshold;
   resizing the plurality of particles of the feedstock so the size of each of the plurality of particles is less than a predetermined particle size;
   feeding the feedstock into a mobile pyrolysis reactor, wherein the mobile pyrolysis reactor is located at the municipal solid waste processing facility;
   pyrolyzing the feedstock via the mobile pyrolysis reactor to generate biochar; and
   increasing an amount of the biochar generated by the mobile pyrolysis reactor relative to other outputs generated by the mobile pyrolysis reactor based on an adjustment of one or more operating characteristics of the mobile pyrolysis reactor.

2. The method of claim 1, wherein the predetermined moisture content threshold is 40 percent.

3. The method of claim 1, wherein the size of each of the plurality of particles comprises a largest cross-sectional area of each of the plurality of particles and wherein the predetermined particle size comprises an area of about 1 in$^2$.

4. The method of claim 1, wherein resizing the plurality of particles comprises manually resizing the plurality of particles and/or feeding the plurality of particles through a chipper and/or a grinder.

5. The method of claim 1, wherein after resizing the plurality of particles the method further comprises the step of:
   drying the feedstock so the moisture content of the feedstock is below a second predetermined moisture content threshold.

6. The method of claim 5, wherein the second predetermined moisture content threshold is 30 percent.

7. The method of claim 1, wherein a weight of the generated biochar comprises between about 5% and about 30% of a weight of the feedstock.

8. The method of claim 1, wherein a weight of the generated biochar is at least about 25% of a weight of the feedstock.

9. The method of claim 1, wherein the one or more operating characteristics comprises at least one of a temperature, a residence time, and a heating rate.

10. A method for management of green and brown waste at a municipal solid waste processing facility, the method comprising the steps of:
    receiving feedstock at the municipal solid waste processing facility, wherein the feedstock is green and brown waste collected separately from other municipal waste, said green and brown waste comprising yard waste and vegetative material, and wherein the feedstock comprises a plurality of particles each having a size;
    inspecting the feedstock for foreign objects;
    removing one or more foreign objects from the feedstock;

drying the feedstock so a moisture content of the feedstock is below a first predetermined moisture content threshold;

resizing the plurality of particles of the feedstock so the size of each of the plurality of particles is less than a predetermined particle size, wherein the resizing comprises manually resizing the plurality of particles and/or feeding the plurality of particles through a chipper and/or a grinder;

drying the feedstock so the moisture content of the feedstock is below a second predetermined moisture content threshold;

feeding the feedstock into a mobile pyrolysis reactor, wherein the mobile pyrolysis reactor is located at the municipal solid waste processing facility;

pyrolyzing the feedstock via the mobile pyrolysis reactor to generate biochar; and increasing an amount of the biochar generated by the mobile pyrolysis reactor relative to other outputs generated by the mobile pyrolysis reactor based on an adjustment of one or more operating characteristics of the mobile pyrolysis reactor.

11. The method of claim 10, wherein the first predetermined moisture content threshold is 40 percent and the second predetermined moisture content threshold is 30 percent.

12. The method of claim 10, wherein the foreign objects comprise metal, plastic, and/or non-organic material.

13. The method of claim 10, wherein a weight of the generated biochar comprises between about 5% and about 30% of a weight of the feedstock.

14. The method of claim 10, wherein a weight of the generated biochar is at least about 25% of a weight of the feedstock.

15. The method of claim 10, wherein the one or more operating characteristics comprises at least one of a temperature, a residence time, and a heating rate.

16. A method for management of green and brown waste at a municipal solid waste processing facility, the method comprising the steps of:

receiving feedstock at the municipal solid waste processing facility, wherein the feedstock is green and brown waste collected separately from other municipal waste, said green and brown waste comprising yard waste and vegetative material;

feeding the feedstock into a pyrolysis reactor located at the municipal solid waste processing facility;

pyrolyzing the feedstock via the pyrolysis reactor to generate biochar; and increasing an amount of the biochar generated by the pyrolysis reactor relative to other outputs generated by the pyrolysis reactor based on an adjustment of one or more operating characteristics of the pyrolysis reactor.

17. The method of claim 16, wherein a weight of the generated biochar comprises between about 5% and about 30% of a weight of the feedstock.

18. The method of claim 16, wherein a weight of the generated biochar is at least about 25% of a weight of the feedstock.

19. The method of claim 16, wherein the one or more operating characteristics comprises at least one of a temperature, a residence time, and a heating rate.

* * * * *